United States Patent
Lee et al.

(10) Patent No.: US 10,030,079 B2
(45) Date of Patent: Jul. 24, 2018

(54) END-FUNCTIONAL CONJUGATED DIENE-BASED POLYMER AND MANUFACTURING METHOD THEREFOR

(71) Applicant: LG Chem, Ltd., Seoul (KR)

(72) Inventors: Romi Lee, Daejeon (KR); Yujin Kim, Daejeon (KR); Noma Kim, Daejeon (KR)

(73) Assignee: LG Chem, Ltd. (KR)

( * ) Notice: Subject to any disclaimer, the term of this patent is extended or adjusted under 35 U.S.C. 154(b) by 279 days.

(21) Appl. No.: 14/911,993

(22) PCT Filed: Aug. 26, 2014

(86) PCT No.: PCT/KR2014/007949
§ 371 (c)(1),
(2) Date: Feb. 12, 2016

(87) PCT Pub. No.: WO2015/056878
PCT Pub. Date: Apr. 23, 2015

(65) Prior Publication Data
US 2016/0194411 A1   Jul. 7, 2016

(30) Foreign Application Priority Data

Oct. 17, 2013 (KR) .......... 10-2013-0124074
Jul. 8, 2014 (KR) .......... 10-2014-0085290

(51) Int. Cl.
| C08C 19/25 | (2006.01) |
| C08K 3/04 | (2006.01) |
| C08K 3/36 | (2006.01) |
| C08K 5/54 | (2006.01) |
| C08F 236/10 | (2006.01) |
| C08C 19/26 | (2006.01) |
| C08C 19/22 | (2006.01) |
| B60C 1/00 | (2006.01) |
| C08C 19/44 | (2006.01) |
| C08L 9/00 | (2006.01) |
| C08L 9/06 | (2006.01) |
| C08L 15/00 | (2006.01) |
| C08L 91/00 | (2006.01) |
| C08L 91/06 | (2006.01) |
| C08K 3/013 | (2018.01) |

(52) U.S. Cl.
CPC .............. *C08C 19/25* (2013.01); *B60C 1/00* (2013.01); *C08C 19/22* (2013.01); *C08C 19/26* (2013.01); *C08C 19/44* (2013.01); *C08F 236/10* (2013.01); *C08K 3/013* (2018.01); *C08K 3/04* (2013.01); *C08K 3/36* (2013.01); *C08K 5/54* (2013.01); *C08L 9/00* (2013.01); *C08L 9/06* (2013.01); *C08L 15/00* (2013.01); *C08L 91/00* (2013.01); *C08L 91/06* (2013.01)

(58) Field of Classification Search
CPC ...................................................... C08C 19/25
See application file for complete search history.

(56) References Cited

U.S. PATENT DOCUMENTS

| 4,935,471 A | 6/1990 | Halasa et al. |
| 2003/0153692 A1 | 8/2003 | Oshima et al. |
| 2010/0099795 A1 | 4/2010 | Uesaka |
| 2010/0099810 A1 | 4/2010 | Nishioka et al. |
| 2010/0105826 A1 | 4/2010 | Uesaka |
| 2013/0023623 A1 | 1/2013 | Nakamura et al. |
| 2013/0296477 A1 | 11/2013 | Minagoshi et al. |
| 2013/0303683 A1 | 11/2013 | Minagoshi et al. |
| 2014/0243476 A1 | 8/2014 | Lee et al. |

FOREIGN PATENT DOCUMENTS

| CN | 101724185 A | 6/2010 |
| CN | 102781968 A | 11/2012 |
| EP | 1714984 A1 | 10/2006 |
| EP | 2520614 A1 | 11/2012 |
| JP | 2010-116546 A | 5/2010 |
| JP | 2010132872 A | 6/2010 |
| JP | 2012207108 A | 10/2012 |
| JP | 2012207109 A | 10/2012 |
| JP | 2013082843 A | 5/2013 |
| JP | 2013087194 A | 5/2013 |
| JP | 2013091756 A | 5/2013 |
| JP | 2014043515 A | 3/2014 |
| KR | 2003-0060752 A | 7/2003 |
| KR | 2013-0018729 A | 2/2013 |
| KR | 2013-0090811 A | 8/2013 |
| WO | 2013119006 A1 | 8/2013 |

OTHER PUBLICATIONS

Extended Search Report from European Application No. 14853538.8, dated Jul. 15, 2016.
International Search Report for Application No. PCT/KR2014/007949 dated Oct. 16, 2014.
Search Report from Office Action dated Nov. 3, 2016 in Chinese Application No. 201480048059.6.

*Primary Examiner* — Peter D Mulcahy
(74) *Attorney, Agent, or Firm* — Lerner, David, Littenberg, Krumholz & Mentlik, LLP

(57) ABSTRACT

Disclosed are an end-functionalized conjugated diene-based polymer represented by Chemical Formula 1 and a method of preparing the same.

22 Claims, No Drawings

END-FUNCTIONAL CONJUGATED DIENE-BASED POLYMER AND MANUFACTURING METHOD THEREFOR

CROSS REFERENCE TO RELATED APPLICATIONS

The present application is a national phase entry under 35 U.S.C. § 371 of International Application No. PCT/KR2014/007949, filed Aug. 26, 2014, published in Korean, which claims the benefit of Korean Patent Application No. 10-2014-0085290, filed Jul. 8, 2014, which claims the benefit of Korean Patent Application No. 10-2013-0124074, filed Oct. 17, 2013. The disclosures of said applications are incorporated by reference herein.

TECHNICAL FIELD

The present invention relates to an end-functionalized conjugated diene-based polymer and a method of preparing the same. More particularly, the present invention relates to an end-functionalized conjugated diene-based polymer having superior compatibility with an inorganic filler, heat build-up, tensile strength, wear resistance, fuel efficiency, and wet grip, and to a method of preparing the same.

BACKGROUND ART

With the increasing demand for stability, durability and fuel economy for vehicles, there is a need to develop rubber having superior wet grip, high mechanical strength and low rolling resistance as a material for vehicle tires, especially tire treads in contact with roads.

Although conventional tire treads have been formed by mixing conjugated diene-based rubber with an inorganic filler for enhancing properties as above, problems of high hysteresis loss or low dispersibility may occur.

Hence, research is ongoing into a modified polymer having superior resilience and thus high fuel savings, as disclosed in Korean Patent Application Publication No. 2003-0060752, but the effects thereof are insufficient.

DISCLOSURE

Technical Problem

The present invention has been made keeping in mind the above problems encountered in the related art, and an object of the present invention is to provide an end-functionalized conjugated diene-based polymer having superior compatibility with an inorganic filler, heat build-up, tensile strength, wear resistance, fuel efficiency, and wet grip, and a method of preparing the same.

Another object of the present invention is to provide a rubber composition comprising the end-functionalized conjugated diene-based polymer, and a tire comprising the rubber composition.

Technical Solution

In order to accomplish the above objects, the present invention provides an end-functionalized conjugated diene-based polymer represented by Chemical Formula 1 below.

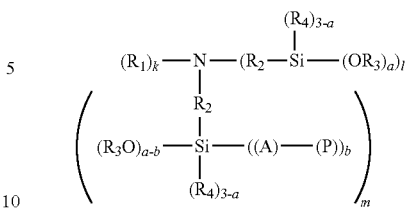

[Chemical Formula 1]

(wherein $R_1$ is an alkyl group or an alkylsilyl group, $R_2$ is an alkyl group or an alkylene group, $R_3$ and $R_4$ are an alkyl group, a is an integer of 1 to 3, 1 and k are an integer of 0 to 2, m is an integer of 1 to 3, with l+k+m satisfying 3, P is a conjugated diene-based polymer chain, A is a compound represented by Chemical Formula 2 below, and b is an integer of 1 to 3. When k is 2, two $R_1$s linked to nitrogen are identical to or different from each other, and in the same manner, when l and m are 2 or more, the corresponding groups are identical to or different from each other.)

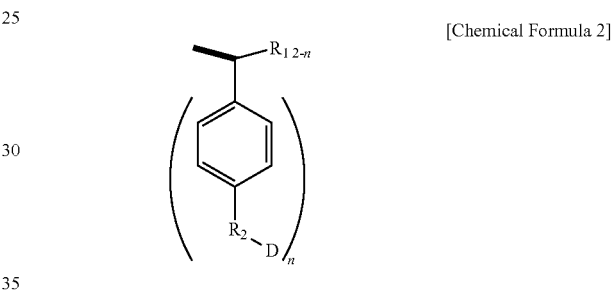

[Chemical Formula 2]

(wherein n is 1 or 2, $R_1$ is hydrogen or a C1~5 alkyl group, $R_2$ is hydrogen, or a C1~5 alkyl group or alkylene group, and D is a group containing oxygen or amine.)

In addition, the present invention provides a method of preparing an end-functionalized conjugated diene-based polymer, comprising: (a) polymerizing a conjugated diene-based monomer or a conjugated diene-based monomer and a vinyl aromatic monomer with an organometallic compound in the presence of a solvent, thus forming an active polymer having a metal end; (b) end-capping the active polymer having a metal end with a compound represented by Chemical Formula 2 below; and (c) modifying the active polymer with a compound represented by Chemical Formula 3 below.

[Chemical Formula 2]

(wherein n is 1 or 2, $R_1$ is hydrogen or a C1~5 alkyl group, $R_2$ is hydrogen, or a C1~5 alkyl group or alkylene group, and D is a group containing oxygen or amine)

[Chemical Formula 3]

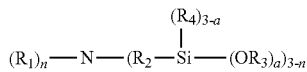

(wherein $R_1$ is an alkyl group or an alkylsilyl group, $R_2$ is an alkyl group or an alkylene group, $R_3$ and $R_4$ are an alkyl group, a is an integer of 1 to 3, and n an integer of 0 to 2. When n is 2, two $R_1$s linked to nitrogen are identical to or different from each other, and in the same manner, when 3−n is 2 or more, the corresponding groups are identical to or different from each other.)

In addition, the present invention provides an end-functionalized conjugated diene-based polymer rubber composition, comprising 100 parts by weight of the end-functionalized conjugated diene-based polymer as above, and 0.1~200 parts by weight of an inorganic filler.

In addition, the present invention provides a tire comprising the end-functionalized conjugated diene-based polymer rubber composition as above.

Advantageous Effects

According to the present invention, an end-functionalized conjugated diene-based polymer having superior compatibility with an inorganic filler, heat build-up, tensile strength, wear resistance, fuel efficiency, and wet grip, and a method of preparing the same can be provided.

BEST MODE

Hereinafter, a detailed description will be given of an end-functionalized conjugated diene-based polymer, a preparation method thereof, a rubber composition comprising the end-functionalized conjugated diene-based polymer, and a tire comprising the rubber composition, according to the present invention.

According to the present invention, an end-functionalized conjugated diene-based polymer is represented by Chemical Formula 1 below.

[Chemical Formula 1]

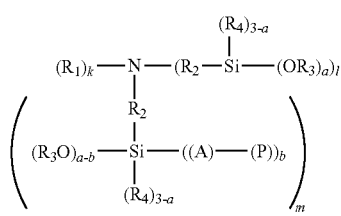

(wherein $R_1$ is an alkyl group or an alkylsilyl group, $R_2$ is an alkyl group or an alkylene group, $R_3$ and $R_4$ are an alkyl group, a is an integer of 1 to 3, l and k are an integer of 0 to 2, m is an integer of 1 to 3, with l+k+m satisfying 3, P is a conjugated diene-based polymer chain, A is a compound represented by Chemical Formula 2 below, and b is an integer of 1 to 3. When k is 2, two $R_1$s linked to nitrogen are identical to or different from each other, and in the same manner, when l and m are 2 or more, the corresponding groups are identical to or different from each other.)

[Chemical Formula 2]

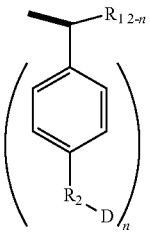

(wherein n is 1 or 2, $R_1$ is hydrogen or a C1~5 alkyl group, $R_2$ is hydrogen, or a C1~5 alkyl group or alkylene group, and D is a group containing oxygen or amine.)

The compound represented by Chemical Formula 2 may include any one or more selected from the group consisting of 4,4'-vinylidenebis(n,n-dimethylaniline), 3-(2-pyrrolidinoethyl)styrene, 4-(2-pyrrolidinoethyl)styrene, and 3-(2-pyrrolidino-1-methylethyl)-α-methylstyrene.

$R_1$ may be a C1~12 alkyl group or alkylsilyl group.
$R_2$ may be a C1~12 alkyl group or alkylene group.
$R_3$ and $R_4$ may be a C1~12 alkyl group.
l may be 0 or 1.
k may be 0 or 1. Given the above range, low hysteresis loss, and high compatibility with an inorganic filler, especially with silica, may result.
m may be 1 or 2, or may alternatively be 2 or 3.
The total number of P may be 1 to 9, preferably 1 to 5, and more preferably 1 to 3. Given the above range, superior wet grip and fuel efficiency for tires may be obtained.

In Chemical Formula 1, k may be 1, l may be 0, and m may be 2.

Alternatively, in Chemical Formula 1, k may be 1, l may be 1, and m may be 1.

The conjugated diene-based polymer chain may be a chain composed exclusively of a conjugated diene-based monomer or a chain comprising a conjugated diene-based monomer and a vinyl aromatic monomer.

Alternatively, the conjugated diene-based polymer chain may be a polymer chain containing an aromatic vinyl monomer in an amount of 0.0001~40 wt %, preferably 10~35 wt % and more preferably 20~30 wt % based on 100 wt % in total of a conjugated diene-based monomer and an aromatic vinyl monomer.

The polymer chain comprising the conjugated diene-based monomer and the vinyl aromatic monomer may be a random polymer chain.

The conjugated diene-based monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene.

The vinyl aromatic monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Particularly useful is styrene or α-methylstyrene.

The end-functionalized conjugated diene-based polymer may have a Mooney viscosity of 65 or more, and preferably 65~90.

Alternatively, the end-functionalized conjugated diene-based polymer may have a Mooney viscosity of 65~85, and preferably 70~80.

The end-functionalized conjugated diene-based polymer may have a number average molecular weight of 1,000~2, 000,000 g/mol, preferably 10,000~1,000,000 g/mol, and more preferably 100,000~500,000 g/mol.

The end-functionalized conjugated diene-based polymer may have a vinyl content of 18% or more, preferably 25% or more, more preferably 30~70%, and most preferably 40~60%. Given the above range, the glass transition temperature of the polymer may be elevated. Thus, when such a polymer is applied to tires, properties required of tires such as running resistance and braking force may become satisfactory and fuel economy may be improved.

As such, the vinyl content refers to an amount of a monomer having a vinyl group, or an amount of not 1,4- but 1,2-added conjugated diene-based monomer based on 100 wt % of the conjugated diene-based monomer.

The end-functionalized conjugated diene-based polymer may have a polydispersity index (PDI) of 0.5~10, preferably 0.5~5, and more preferably 1.0~2.0.

According to the present invention, a method of preparing the end-functionalized conjugated diene-based polymer comprises: (a) polymerizing a conjugated diene-based monomer or a conjugated diene-based monomer and a vinyl aromatic monomer with an organometallic compound in the presence of a solvent, thus forming an active polymer having a metal end; (b) end-capping the active polymer having a metal end with a compound represented by Chemical Formula 2 below; and (c) modifying the active polymer with a compound represented by Chemical Formula 3 below.

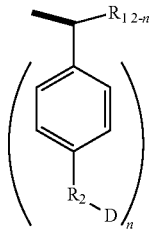

[Chemical Formula 2]

(wherein n is 1 or 2, $R_1$ is hydrogen or a C1~5 alkyl group, $R_2$ is hydrogen, or a C1~5 alkyl group or alkylene group, and D is a group containing oxygen or amine)

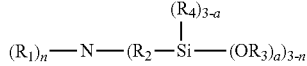

[Chemical Formula 3]

(wherein $R_1$ is an alkyl group or an alkylsilyl group, $R_2$ is an alkyl group or an alkylene group, $R_3$ and $R_4$ are an alkyl group, a is an integer of 1 to 3, and n an integer of 0 to 2. When n is 2, two $R_1$s linked to nitrogen are identical to or different from each other, and in the same manner, when 3−n is 2 or more, the corresponding groups are identical to or different from each other.)

As such, n may be 0 or 1.

The compound represented by Chemical Formula 2 may include any one or more selected from the group consisting of 4,4'-vinylidenebis(n,n-dimethylaniline), 3-(2-pyrrolidinoethyl)styrene, 4-(2-pyrrolidinoethyl)styrene, and 3-(2-pyrrolidino-1-methylethyl)-α-methylstyrene.

The compound represented by Chemical Formula 2 may be added in an amount of 0.05~10 wt % based on a total monomer amount.

$R_1$ to $R_4$ are defined as above.

The conjugated diene-based monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene.

The vinyl aromatic monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Particularly useful is styrene or α-methylstyrene.

The amount of the vinyl aromatic monomer may be 0.0001~40 wt %, preferably 10~35 wt %, and more preferably 20~30 wt %, based on 100 wt % in total of the conjugated diene monomer and the aromatic vinyl monomer.

The vinyl aromatic monomer may contain an aromatic vinyl monomer in an amount of 0.0001~40 wt %, preferably 10~35 wt %, and more preferably 20~30 wt %, based on 100 wt % in total of the conjugated diene monomer and the aromatic vinyl monomer.

The organometallic compound may be an organo-alkali metal compound, or may include at least one selected from the group consisting of an organolithium compound, an organosodium compound, an organopotassium compound, an organorubidium compound, and an organocesium compound.

Alternatively, the organometallic compound may include at least one selected from the group consisting of methyllithium, ethyllithium, isopropyllithium, n-butyllithium, sec-butyllithium, tert-butyllithium, n-decyllithium, tert-octyllithium, phenyllithium, 1-naphthyllithium, n-eicosyllithium, 4-butylphenyllithium, 4-tolyllithium, cyclohexyllithium, 3,5-di-n-heptylcyclohexyllithium, and 4-cyclopentyllithium.

Alternatively, the organometallic compound may be n-butyllithium, sec-butyllithium, or mixtures thereof.

Alternatively, the organometallic compound may include at least one selected from the group consisting of naphthyl sodium, naphthyl potassium, lithium alkoxide, sodium alkoxide, potassium alkoxide, lithium sulfonate, sodium sulfonate, potassium sulfonate, lithium amide, sodium amide, and potassium amide, and may be used in combination with another organometallic compound.

The organometallic compound may be used in an amount of 0.01~10 mmol, preferably 0.05~5 mmol, more preferably 0.1~2 mmol, and most preferably 0.1~1 mmol, based on 100 g in total of the monomer.

The molar ratio of the organometallic compound to the compound represented by Chemical Formula 3 may be 1:0.1~1:10, and preferably 1:0.5~1:2.

As used herein, the active polymer having a metal end refers to a polymer comprising a polymer anion and a metal cation, which are coupled with each other.

In the method of preparing the end-functionalized conjugated diene-based polymer according to the present invention, polymerizing in (a) may be performed with the additional use of a polar additive.

The polar additive may be a base. Alternatively, the polar additive may be ether, amine or mixtures thereof, or may be selected from the group consisting of tetrahydrofuran, ditetrahydrofurylpropane, diethylether, cycloamylether, dipropylether, ethylenedimethylether, ethylenedimethylether, diethyleneglycol, dimethylether, tert-butoxyethoxyethane bis(2-dimethylaminoethyl)ether, (dimethylaminoethyl)ethylether, trimethylamine, triethylamine, tripropylamine, and tetramethylethylenediamine. Alternatively, the polar additive may be ditetrahydropropylpropane, triethylamine, or tetramethylethylenediamine.

The polar additive may be used in an amount of 0.001~50 g, preferably 0.001~10 g, more preferably 0.005~1 g, and most preferably 0.005~0.1 g, based on 100 g in total of the added monomer.

Alternatively, the molar ratio of the polar additive relative to the added organometallic compound may be 0.1~10, preferably 0.5~7, and more preferably 0.5~4.

When the conjugated diene-based monomer and the vinyl aromatic monomer are copolymerized, it is easy to prepare a block copolymer due to a difference in reaction rate therebetween. However, the addition of the polar additive is effective at increasing the low reaction rate of the vinyl aromatic compound so as to derive a microstructure of the corresponding copolymer, for example, a random copolymer.

Polymerizing in (a) may be performed via anionic polymerization.

Alternatively, polymerizing in (a) may be conducted via living anion polymerization that enables the formation of the active end by growth reaction by anions.

Polymerizing in (a) may be carried out via elevated temperature polymerization or fixed temperature polymerization.

Elevated temperature polymerization is a polymerization process where heat is applied after addition of the organometallic compound so as to elevate a reaction temperature, and fixed temperature polymerization is a polymerization process where heat is not applied after addition of the organometallic compound.

Polymerizing in (a) may be implemented at −20~200° C., preferably 0~150° C., and more preferably 10~120° C.

Modifying in (b) may be performed by adding at least one compound represented by Chemical Formula 1, or two or three compounds represented by Chemical Formula 1.

Modifying in (b) may also be performed at 0~90° C. for 1 min~5 hr.

The method of preparing the end-functionalized conjugated diene-based polymer according to the present invention may be a batch polymerization process, or a continuous polymerization process using one or more reactors.

According to the present invention, an end-functionalized conjugated diene-based polymer may be prepared by the method as above.

According to the present invention, an end-functionalized conjugated diene-based polymer rubber composition comprises 100 parts by weight of the end-functionalized conjugated diene-based polymer and 0.1~200 parts by weight of an inorganic filler.

The end-functionalized conjugated diene-based polymer rubber composition may further include another end-functionalized conjugated diene-based polymer.

The other end-functionalized conjugated diene-based polymer may be styrene-butadiene rubber (SBR), butadiene rubber (BR), natural rubber, or mixtures thereof.

SBR may be solution styrene-butadiene rubber (SSBR).

The end-functionalized conjugated diene-based polymer rubber composition according to the present invention may be composed of 20~100 parts by weight of the end-functionalized conjugated diene-based polymer and 0~80 parts by weight of another end-functionalized conjugated diene-based polymer.

Alternatively, the end-functionalized conjugated diene-based polymer rubber composition according to the present invention may be composed of 20~99 parts by weight of the end-functionalized conjugated diene-based polymer and 1~80 parts by weight of another end-functionalized conjugated diene-based polymer.

Alternatively, the end-functionalized conjugated diene-based polymer rubber composition according to the present invention may be composed of 10~100 parts by weight of the end-functionalized conjugated diene-based polymer, 0~90 parts by weight of another end-functionalized conjugated diene-based polymer, 0~100 parts by weight of carbon black, 5~200 parts by weight of silica, and 2~20 parts by weight of a silane coupling agent.

Alternatively, the end-functionalized conjugated diene-based polymer rubber composition according to the present invention may be composed of 10~100 parts by weight of the end-functionalized conjugated diene-based polymer, 0~90 parts by weight of another end-functionalized conjugated diene-based polymer, 0~100 parts by weight of carbon black, 5~200 parts by weight of silica, and 2~20 parts by weight of a silane coupling agent, wherein the total weight of the end-functionalized conjugated diene-based polymer and another end-functionalized conjugated diene-based polymer is 100 parts by weight.

Alternatively, the end-functionalized conjugated diene-based polymer rubber composition according to the present invention may be composed of 100 parts by weight of a polymer mixture comprising 10~99 wt % of the end-functionalized conjugated diene-based polymer and 1~90 wt % of another end-functionalized conjugated diene-based polymer, 1~100 parts by weight of carbon black, 5~200 parts by weight of silica, and 2~20 parts by weight of a silane coupling agent.

The inorganic filler may be used in an amount of 10~150 parts by weight, and preferably 50~100 parts by weight.

The inorganic filler may be carbon black, a silica-based filler, or mixtures thereof.

Alternatively, the inorganic filler may be silica. As such, dispersibility may be significantly improved, and silica particles are linked (capped) to the end of the end-functionalized conjugated diene-based polymer according to the present invention, thus remarkably decreasing hysteresis loss.

The end-functionalized conjugated diene-based polymer rubber composition may further include 1~100 parts by weight of an oil.

The oil may be exemplified by a mineral oil or a softener.

The oil may be used in an amount of 10~100 parts by weight, and preferably 20~80 parts by weight, based on 100 parts by weight of the conjugated diene-based copolymer. Given the above range, desired properties may be efficiently exhibited, and the rubber composition may be appropriately softened and thus be effectively processed.

The end-functionalized conjugated diene-based polymer rubber composition may be utilized as a material for a tire or a tire tread.

According to the present invention, a tire comprises the end-functionalized conjugated diene-based polymer rubber composition as above.

In the present invention, a modifier may be a compound represented by Chemical Formula 3 below.

[Chemical Formula 3]

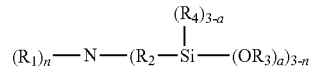

(wherein $R_1$ is an alkyl group or an alkylsilyl group, $R_2$ is an alkyl group or an alkylene group, $R_3$ and $R_4$ are an alkyl group, a is an integer of 1 to 3, and n an integer of 0 to 2. When n is 2, two $R_1$s linked to nitrogen are identical to or different from each other, and in the same manner, when 3−n is 2 or more, the corresponding groups are identical to or different from each other.)

Mode for Invention

The following examples of the present invention are disclosed for illustrative purposes, but those skilled in the art will appreciate that various modifications, additions and substitutions are possible, without departing from the scope and spirit of the invention as disclosed in the accompanying claims.

EXAMPLE

Example 1

In a 20 L autoclave reactor, 260 g of styrene, 720 g of 1,3-butadiene, 5000 g of n-hexane, and 1.3 g of 2,2-bis(2-oxoranyl)propane as a polar additive were placed, and the inner temperature of the reactor was elevated to 40° C. When the inner temperature of the reactor reached 40° C., 4 mmol n-butyllithium was placed in the reactor, so that an adiabatic heating reaction progressed until being stable. 20 min after completion of the adiabatic heating reaction, 20 g of 1,3-butadiene was added, thus forming an active polymer having a lithium end. Then, 0.5 g of 3- or 4-pyrrolidinoethylstyrene was added, and the reaction was carried out for 30 min, thus end-capping the active polymer.

Subsequently, 5 mmol bis(methyldiethoxysilylpropyl)-N-methylamine was added and the reaction was carried out for 15 min. Thereafter, the polymerization reaction was stopped using ethanol, and the reaction product was added with 5 mL of a solution of 0.3 wt % butylated hydroxytoluene (BHT) as an antioxidant dissolved in hexane.

The resulting polymer was placed in warm water heated with steam, stirred to remove the solvent, and roll dried to remove the residual solvent and water, thus preparing an end-functionalized conjugated diene-based polymer. The results of analysis of the end-functionalized conjugated diene-based polymer thus prepared are shown in Table 1 below.

Example 2

An end-functionalized conjugated diene-based polymer was prepared in the same manner as in Example 1, with the exception that 3- or 4-pyrrolidinoethylstyrene was added in an amount of 1 g, instead of 0.5 g. The results of analysis of the end-functionalized conjugated diene-based polymer thus prepared are shown in Table 1 below.

Example 3

An end-functionalized conjugated diene-based polymer was prepared in the same manner as in Example 1, with the exception that (3-(2-pyrrolidino-1-methylethyl)-α-methylstyrene, instead of 3- or 4-pyrrolidinoethylstyrene, was added in an amount of 1 g. The results of analysis of the end-functionalized conjugated diene-based polymer thus prepared are shown in Table 1 below.

Comparative Example 1

An end-functionalized conjugated diene-based polymer was prepared in the same manner as in Example 1, with the exception that bis(methyldiethoxysilylpropyl)-N-methylamine was not added. The results of analysis of the end-functionalized conjugated diene-based polymer thus prepared are shown in Table 1 below.

Comparative Example 2

A random functionalized conjugated diene-based polymer was prepared in the same manner as in Example 1, with the exception that bis(methyldiethoxysilylpropyl)-N-methylamine was not added, and 3- or 4-pyrrolidinoethylstyrene was polymerized together with styrene and butadiene. The results of analysis of the random functionalized conjugated diene-based polymer thus prepared are shown in Table 1 below.

Comparative Example 3

An end-functionalized conjugated diene-based polymer was prepared in the same manner as in Example 1, with the exception that 3- or 4-pyrrolidinoethylstyrene was not added.

The results of analysis of the end-functionalized conjugated diene-based polymer thus prepared are shown in Table 1 below.

The end or random functionalized conjugated diene-based polymers of Examples 1 to 3 and Comparative Examples 1 to 3 were measured and analyzed as follows.

i) Mooney viscosity: Two samples having a weight of 15 g or more were preheated for 1 min and then measured at 100° C. for 4 min using MV-2000 made by ALPHA Technologies.

ii) Styrene monomer (SM) and Vinyl content: Measurement was conducted using NMR.

iii) Weight average molecular weight (Mw), Number average molecular weight (Mn), and Polydispersity Index (PDI): Measurement was conducted via GPC analysis at 40° C.

As such, a column was composed of a combination of two PLgel Olexis columns and one PLgel mixed-C column, available from Polymer Laboratories, and all newly replaced columns were mixed bed type columns. Also, polystyrene (PS) was a GPC standard material for calculation of the molecular weight.

TABLE 1

| | | Ex. 1 | Ex. 2 | Ex. 3 | C. Ex. 1 | C. Ex. 2 | C. Ex. 3 |
|---|---|---|---|---|---|---|---|
| Sample | | A | B | C | D | E | F |
| Modified | Kind | a | a | b | a | a | — |
| monomer | Amount (wt %) | 0.5 | 1 | 1 | 0.5 | — | — |
| Modifier | | @ | @ | @ | — | @ | @ |
| Mooney Viscosity | | 74 | 74 | 75 | 63 | — | 74 |
| Tg (° C.) | | −25.4 | −25.2 | −25.4 | −24.3 | −26.3 | −25.4 |
| Styrene (%) | | 27 | 27 | 27 | 27 | 26 | 27 |
| Vinyl (%) | | 42 | 41 | 42 | 40 | 43 | 42 |
| GPC ($\times 10^4$) | Mn | 36 | 35 | 36 | 34 | 37 | 36 |
| | Mw | 48 | 46 | 50 | 42 | 51 | 47 |
| | PDI | 1.3 | 1.3 | 1.4 | 1.2 | 1.4 | 1.3 | a: 3 or 4-pyrrolidinoethylstyrene
b: (3-(2-pyrrolidino-1-methylethyl)-α-methylstyrene
@: bis(3-diethoxymethylsilylpropyl)N-methylamine

TABLE 2

| (Unit: parts by weight) | S-1 |
|---|---|
| Rubber | 100.0 |
| Silica | 70.0 |
| Coupling agent | 11.02 |
| Oil | 33.75 |
| Zinc oxide | 3.0 |
| Stearic acid | 2.0 |
| Antioxidant | 2.0 |
| Anti-aging agent | 2.0 |
| Wax | 1.0 |
| Rubber accelerator | 1.75 |
| Sulfur | 1.5 |
| Vulcanization accelerator | 2.0 |
| Total weight | 230.2 |

The samples of Examples 1 to 3 and Comparative Examples 1 to 3 as shown in Table 1 were used as raw rubber, and mixed under mixing conditions shown Table 2, thus preparing end-functionalized conjugated diene-based polymer rubber compositions of Examples 4 to 6 and Comparative Examples 4 to 6.

The end-functionalized conjugated diene-based polymer rubber composition was kneaded as follows. Specifically, upon primary kneading using a Banbury mixer equipped with a temperature controller, raw rubber (end-functionalized conjugated diene-based polymer), a filler, an organosilane coupling agent, oil, zinc oxide, a stearic acid antioxidant, an anti-aging agent, wax and an accelerator were kneaded at 80 rpm. As such, the temperature of the kneader was controlled, thus obtaining a first mixture at a discharge temperature of 140~150° C. Upon secondary kneading, the first mixture was cooled to room temperature, and then rubber, sulfur and a vulcanization accelerator were placed in the kneader, thus obtaining a second mixture at a discharge temperature of 45~60° C. Upon tertiary kneading, the second mixture was molded, and vulcanized using a vulcanization press at 180° C. for T90+10 min, thus manufacturing vulcanized rubber.

Properties of the vulcanized rubber were measured as follows.

1) Tensile Testing

According to a tensile testing method of ASTM 412, tensile strength upon cutting a test sample and tensile stress (300% modulus) at 300% elongation were measured.

2) Viscoelasticity

A dynamic mechanical analyzer made by TA was used. When undergoing deformation under conditions of a frequency of 10 Hz in a distortion mode and a measurement temperature (0~60° C.), Tan δ of each sample was measured and represented as an index based on 100 for Comparative Example 1. As Tan δ at a low temperature of 0° C. was higher and Tan δ at a high temperature of 60° C. was lower, the index became larger and was thus utilized as an indicator of improved properties.

When Tan δ at a low temperature of 0° C. was higher, wet grip became superior, and when Tan δ at a high temperature of 60° C. was lower, low hysteresis loss and low rolling resistance of tires, namely, improved fuel efficiency, resulted. Table 3 below shows the properties of the vulcanized rubber.

TABLE 3

| | Ex. 4 | Ex. 5 | Ex. 6 | C. Ex. 4 | C. Ex. 5 | C. Ex. 6 |
|---|---|---|---|---|---|---|
| Sample | A | B | C | D | E | F |
| 300% Modulus (kgf/cm$^2$) | 124 | 128 | 130 | 122 | 118 | 121 |
| Tensile strength (kgf/cm$^2$) | 183 | 185 | 181 | 192 | 185 | 168 |
| Tan δ at 0° C. | 111 | 111 | 114 | 100 | 100 | 110 |
| Tan δ at 60° C. | 107 | 108 | 106 | 100 | 93 | 103 |

As is apparent from Table 3, the end-functionalized conjugated diene-based polymer rubber compositions of Examples 4 to 6 according to the present invention were significantly improved in 300% modulus (tensile stress) and tensile strength, compared to Comparative Examples 4 to 6. Furthermore, the index of Tan δ at 0° C. was high. Therefore, when the end-functionalized conjugated diene-based polymer according to the present invention was contained in tires, superior wet grip was obtained.

Also, the end-functionalized conjugated diene-based polymers of Examples 4 to 6 according to the present invention exhibited relatively high Tan δ at 60° C. compared to Comparative Examples 4 to 6. Hence, when the end-functionalized conjugated diene-based polymer according to the present invention was contained in tires, low rolling resistance resulted, compared to conventional techniques.

Particularly in Example 5, as the amount of modified monomer was higher, Tan δ at 60° C. was greater than in Example 4, which is considered to be due to the monomer effect.

The invention claimed is:

1. An end-functionalized conjugated diene-based polymer represented by Chemical Formula 1 below,

[Chemical Formula 1]

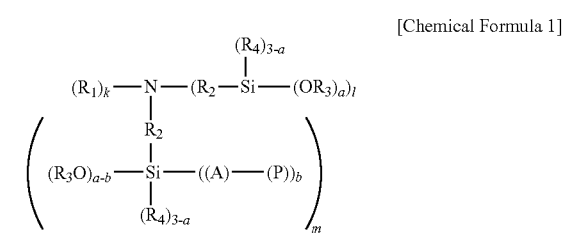

wherein in Chemical Formula 1, $R_1$ is an alkyl group or an alkylsilyl group, $R_2$ is an alkylene group, $R_3$ and $R_4$ are an alkyl group, a is an integer of 1 to 3, l and k are an integer of 0 to 2, m is an integer of 1 to 3, with l+k+m satisfying 3, P is a conjugated diene-based polymer chain, A is a compound represented by Chemical Formula 2 below, and b is an integer of 1 to 3, and when k is 2, two $R_1$s linked to nitrogen are identical to or different from each other, and in a same manner, when l and m are 2 or more, corresponding groups are identical to or different from each other,

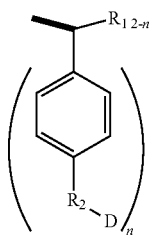

[Chemical Formula 2]

wherein in Chemical Formula 2, n is 1 or 2, $R_1$ is hydrogen or a C1~5 alkyl group, $R_2$ is C1~5 alkylene group, and D is a group containing oxygen or amine.

2. The end-functionalized conjugated diene-based polymer of claim 1, wherein the compound represented by Chemical Formula 2 comprises any one or more selected from the group consisting of 3-(2-pyrrolidinoethyl)styrene, 4-(2-pyrrolidinoethyl)styrene, and 3-(2-pyrrolidino-1-methylethyl)-α-methylstyrene.

3. The end-functionalized conjugated diene-based polymer of claim 1, wherein l is 0 or 1.

4. The end-functionalized conjugated diene-based polymer of claim 1, wherein k is 0 or 1.

5. The end-functionalized conjugated diene-based polymer of claim 1, wherein in Chemical Formula 1, k is 1, l is 1, and m is 1.

6. The end-functionalized conjugated diene-based polymer of claim 1, wherein the conjugated diene-based polymer chain is a random copolymer chain comprising a conjugated diene-based monomer and a vinyl aromatic monomer.

7. The end-functionalized conjugated diene-based polymer of claim 1, wherein the end-functionalized conjugated diene-based polymer has a number average molecular weight of 1,000~2,000,000 g/mol.

8. The end-functionalized conjugated diene-based polymer of claim 1, wherein the end-functionalized conjugated diene-based polymer has a vinyl content of 18% or more.

9. The end-functionalized conjugated diene-based polymer of claim 1, wherein the end-functionalized conjugated diene-based polymer contains 10~40 wt % of an aromatic vinyl monomer based on 100 wt % in total of a conjugated diene-based monomer and an aromatic vinyl monomer.

10. The end-functionalized conjugated diene-based polymer of claim 1, wherein the end-functionalized conjugated diene-based polymer has a Mooney viscosity of 65 or more.

11. A method of preparing an end-functionalized conjugated diene-based polymer, comprising:

(a) polymerizing a conjugated diene-based monomer or a conjugated diene-based monomer and a vinyl aromatic monomer with an organometallic compound using a solvent, thus forming an active polymer having a metal end;

(b) end-capping the active polymer having alkali metal end with a compound represented by Chemical Formula 2 below; and (c) modifying the active polymer with a compound represented by Chemical Formula 3 below,

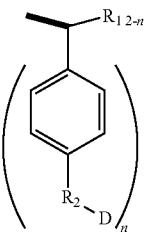

[Chemical Formula 2]

wherein in Chemical Formula 2, n is 1 or 2, $R_1$ is hydrogen or a C1~5 alkyl group, $R_2$ is a C1~5 alkylene group, and D is a group containing oxygen or amine,

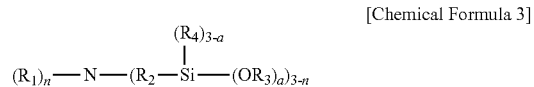

[Chemical Formula 3]

wherein in Chemical Formula 3, $R_1$ is an alkyl group or an alkylsilyl group, $R_2$ is an alkylene group, $R_3$ and $R_4$ are an alkyl group, a is an integer of 1 to 3, and n is an integer of 0 to 2, and when n is 2, two $R_1$s linked to nitrogen are identical to or different from each other, and in a same manner, when 3−n is 2 or more, corresponding groups are identical to or different from each other.

12. The method of claim 11, wherein the compound represented by Chemical Formula 2 comprises any one or more selected from the group consisting of 3-(2-pyrrolidinoethyl)styrene, 4-(2-pyrrolidinoethyl)styrene, and 3-(2-pyrrolidino-1-methylethyl)-α-methylstyrene.

13. The method of claim 11, wherein the compound represented by Chemical Formula 2 is contained in an amount of 0.05~10 wt % based on a total monomer amount.

14. The method of claim 11, wherein the organometallic compound is an organo-alkali metal compound.

15. The method of claim 11, wherein the organometallic compound is used in an amount of 0.01~10 mmol based on 100 g in total of the monomer.

16. The method of claim 11, wherein a molar ratio of the organometallic compound to the compound represented by Chemical Formula 3 is 1:0.1~1:10.

17. The method of claim 11, wherein polymerizing in (a) is performed with additional use of a polar additive.

18. The method of claim 17, wherein the polar additive is used at a molar ratio of 0.1~10 relative to 1 mmol of the organometallic compound.

19. An end-functionalized conjugated diene-based polymer rubber composition, comprising 100 parts by weight of the end-functionalized conjugated diene-based polymer of claim 1, and 0.1~200 parts by weight of an inorganic filler.

20. The end-functionalized conjugated diene-based polymer rubber composition of claim 19, comprising 100 parts by weight of a polymer mixture comprising 10~100 wt % of the end-functionalized conjugated diene-based polymer and 0~90 wt % of another end-functionalized conjugated diene-based polymer, 0~100 parts by weight of carbon black, 5~200 parts by weight of silica, and 2~20 parts by weight of a silane coupling agent.

21. The end-functionalized conjugated diene-based polymer rubber composition of claim 19, wherein the inorganic filler is a silica-based filler.

22. A tire comprising the end-functionalized conjugated diene-based polymer rubber composition of claim 19.

* * * * *